United States Patent [19]

Lalancette

[11] 4,277,449

[45] Jul. 7, 1981

[54] DRY REACTION PROCESS OF ASBESTOS TAILINGS AND AMMONIUM SULFATE

[75] Inventor: Jean-Marc Lalancette, Sherbrooke, Canada

[73] Assignee: Societe Nationale de l'Aminate, Quebec, Canada

[21] Appl. No.: 35,267

[22] Filed: May 1, 1979

Related U.S. Application Data

[63] Continuation-in-part of Ser. No. 15,435, Feb. 26, 1979, abandoned.

[51] Int. Cl.³ .............................................. C01F 5/40
[52] U.S. Cl. .................................... 423/167; 423/554
[58] Field of Search ................................ 423/167, 554

[56] References Cited

U.S. PATENT DOCUMENTS 3,338,667   8/1967   Pundsack ............................ 423/162

OTHER PUBLICATIONS

Babor, Basic College Chemistry, Second Edition, Thomas Y. Crowell Company, New York (1953) pp. 225–257.

Primary Examiner—O. R. Vertiz
Assistant Examiner—Wayne A. Langel

[57] ABSTRACT

There is disclosed a dry process for preparing magnesium sulfate by heating one surface of a reaction mixture of asbestos tailings to a temperature of from 350° to 400° C. whereby there is provided a gradient temperature between the heated zone, an intermediate zone and the outside zone where the ammonium bisulfate formed can condense in one of the last two zones which are at a temperature lower than 250° C. and react with ammonia to provide a new supply of ammonium sulfate for further reaction with the asbestos tailings and recovering the magnesium sulfate thus obtained.

10 Claims, No Drawings

DRY REACTION PROCESS OF ASBESTOS TAILINGS AND AMMONIUM SULFATE

The present application is a continuation-in-part application of application Ser. No. 15,435, filed Feb. 26, 1979, abandoned.

BACKGROUND OF THE INVENTION

1. Field of the Invention

The present invention relates to a novel process for extracting useful magnesium salts from serpentine mineral wastes such as asbestos tailings. More particularly, the invention relates to a process for extracting magnesium salts from asbestos tailings, the process being characterized by substantial reduction of the amount energy and in the possibility of recycling some of the by-products formed during the extraction process.

2. Description of the Prior Art

A major by-product or waste material in the production of chrysotile asbestos is the crushed and partially ground mother rock from which the fibrous asbestos has been separated and the fines or dust of asbestos too short for any practical applications. These materials, commonly termed "tailings" and "floats" in the industry, primarily comprise hydrated magnesium silicates of the serpentine family, and typically contain magnetite and minor quantities of other minerals including iron, chromium and nickel, normally to the extent of several percent by weight, as impurities. The quantities of such waste materials or products produced daily by a modern asbestos mill amounts to thousands of tons, and over the years considerable effort has been devoted to finding a practical use or uses for these waste materials.

It is known from the prior art that strong mineral acids will readily react with or attack serpentine tailings to form corresponding magnesium salts which can then be separated from the insoluble silica residue. For example, sulfuric acid has been proposed in U.S. Pat. No. 2,402,370, June 18, 1946, Chalmers, ammonium bisulfate in U.S. Pat. No. 3,338,667, Aug. 29, 1976, Pundsack, sulfur dioxide in U.S. Pat. No. 1,865,224, June 28, 1932, Winston et al, hydrochloric acid in Canadian Pat. No. 1,034,385, July 11, 1978, Marek et al, and leaching with carbonic acid, U.S. Pat. No. 3,320,029, May 16, 1967, Adams and U.S. Pat. No. 4,058,587, Nov. 15, 1977. All these processes can generally be termed as a "wet process" since they are carried out in the presence of water and these involve complex recovery procedure of the magnesium salt formed.

The possibility of a reaction between asbestos tailings and ammonium sulfate is well proven by the patent of Dolbear (U.S. Pat. No. 1,348,933). This patent indicates that an insoluble magnesium compound such as magnesium oxide or magnesium carbonate can be reacted with ammonium sulfate at the temperature of boiling water to give the corresponding magnesium sulfate:

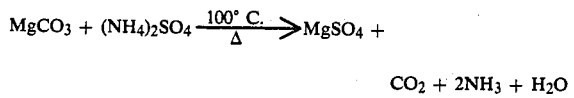

$$MgCO_3 + (NH_4)_2SO_4 \xrightarrow[\Delta]{100° C.} MgSO_4 + CO_2 + 2NH_3 + H_2O$$

It is obvious to anyone familiar with chemistry that since silicic acid is a much weaker acid than carbonic acid (pka of silicic acid: $2.2 \times 10^{-10}$ pka of carbonic acid: $4.3 \times 10^{-7}$), if the reaction works with a carbonate, it will also work with a silicate such as magnesium silicate, i.e.: tailings of asbestos.

The wet process developed by Dolbear proved to be entirely impractical on economic basis since so much water has to be distilled in order to displace ammonia that the cost of the resulting product was prohibitive. This situation arises from the fact that ammonia is very soluble in water. If some ammonia is left in water, the reaction is reversed.

However, since the dry mixture of ammonium sulfate and asbestos tailings was reacting even at room temperature I have used the dry reaction as a source of magnesium sulfate, the rate of reaction being accelerated by heating at an appropriate temperature. Of course, in using the dry mixture, the evolution of ammonia does not call for the distillation of any water, $NH_3$ being liberated as a gas.

It is known in the chemical literature since the end of the last century that if ammonium sulfate is heated above a temperature of 250° C., it will decompose into ammonia and ammonium bisulfate (Smith, J.Soc. Chem. Ind. 14, 529 (1895)) according to the following equation:

$$(NH_4)_2SO_4 \rightarrow NH_4HSO_4 + NH_3 \uparrow$$

Contrary to the teaching of Pundsack (U.S. Pat. No. 3,338,667) who indicates the usefulness of the bisulfate of ammonium in his process, it has been found that the decomposition of ammonium sulfate to ammonium bisulfate was very detrimental as far as the energy requirement of the reaction was concerned. In fact, in the Pundsack's disclosure, it is indicated that ammonium bisulfate rather than ammonium sulfate is the active reagent for the leaching of magnesium from the asbestos wastes either with the so-called "wet" process or "dry" process.

It has been found that the formation of bisulfate has to be limited as much as possible for the following reasons. First, the decomposition of ammonium sulfate to ammonium bisulfate is an endothermic reaction which calls for the expediture of 25.99 K cal per mole of ammonia evolved, in the standard state. Secondly, it has also been found that when ammonium bisulfate is formed, it has a marked tendency to sublimate outside the reaction mixture, thus preventing reaction with the tailings and inducing additional energy losses associated with the heat of sublimation. Repeating the reaction in a Lindberg furnace, as prescribed by Pundsack, it has been found that since the totality of the mixture quickly attains the temperature to which it is heated there is a decomposition of the ammonium sulfate into free ammonia and ammonium bisulfate, but at a temperature of about 300° C. the ammonium bisulfate sublimates and has a tendency to recombine with part of the liberated ammonia thus decreasing the rate of reaction with the magnesium oxide and increasing the time and energy required to carry out the reaction to the point required to obtain a suitable yield. It is readily observed when operating this process in this fashion that a certain quantity of ammonium sulfate is to be found at the opening of the furnace thus confirming that part of the sublimated ammonium bisulfate has reacted with part of the liberated ammonia. Furthermore, it has been found that the sublimation of the bisulfate practically more than doubles the amount of energy required to achieve the reaction.

Accordingly it would appear that the advantages of operating the reaction of asbestos tailings with ammonium sulfate could be greatly enhanced if a procedure could be found whereby the ammonium bisulfate formed could be prevented from escaping from the reaction system so that the energy expanded for its preparation could remain in the system and used to advantage.

SUMMARY OF THE INVENTION

In accordance with the present invention, the heating of a dry mixture of ammonium sulfate and asbestos tailings is carried out under conditions such as to limit the formation and to avoid the sublimation of the ammonium bisulfate outside of the reacting mixture and in fact to facilitate the immediate recombination of the ammonium bisulfate formed with ammonia. This objective is achieved by heating one surface only of the reaction mixture and thus favoring a heat gradient to be established through the reacting mixture.

In practice, the heating of a dry homogeneous mixture of ammonium sulfate and asbestos tailings is carried out under conditions whereby a single heated area is provided and there is always a difference of temperature between the heated area and the area furthest away from said heated area. In other words, there is a gradient of temperature throughout the reaction mixture. Unexpectedly, it has been found that the ammonium bisulfate that is formed by the thermal decomposition of ammonium sulfate when going to a cooler zone which is at a lower temperature than the sublimation temperature of ammonium bisulfate, that is below 300° C., will condense at the cooler temperature and react with the ammonia to give ammonium sulfate thus preventing its escape from the reacting mass and keeping the thus formed ammonium sulfate available for further reaction with the asbestos tailings.

More specifically, a certain layer of the homogeneous mixture is provided and heat is applied to one of its surface only whereby there will be a gradual temperature variation during the process between the heated layer and the layer furthest away from the heated layer, the temperature within the reaction mixture will always be below the sublimation temperature of the ammonium bisulfate.

DETAILED DESCRIPTION

Accordingly the improved process of the present invention for forming magnesium sulfate by the reaction of asbestos tailings and ammonium sulfate comprises heating one surface of a homogeneous dry mixture of asbestos tailings and ammonium sulfate from room temperature to a temperature within the range of from 350° to 400° C. whereby until the temperature of the heated zone reaches about 250° C. the ammonium sulfate reacts with the asbestos tailings with evolution of gaseous ammonia. While the temperature of the heated zone progresses from 250° C. to about 300° C., the ammonium sulfate will decompose into gaseous ammonium bisulfate and ammonia while when the temperature goes from 300° C. to the selected temperature between 350° to 400° C. the gaseous ammonium bisulfate will sublimate. As the gaseous ammonia and sublimated ammonium bisulfate will progress to an intermediate zone of the mixture which is at a temperature below 250° C., there will be a condensation of the ammonium bisulfate with subsequent reaction with ammonia to form a new supply of ammonium sulfate which then becomes available for reaction with the asbestos tailings. As the intermediate zone reaches a temperature above 250° C., the unreacted ammonium sulfate in this zone decomposes to ammonium bisulfate and ammonia, and as the latter two gases reach the outer zone of the reaction mixture which is at a temperature lower than 250° C., the ammonium bisulfate condenses and reacts with the ammonia to form a further supply of ammonium sulfate which reacts with the asbestos tailings, the heating of the first outer layer is continued until the temperature of the zone furthest away from the heating zone reaches a temperature of from 250° and 300° C. Subsequently the reaction mass is discharged from the heating and the magnesium sulfate is recovered.

It will be appreciated that the present invention heats only one surface of the reaction mass in opposition to the heating procedure described by Pundsack in U.S. Pat. No. 3,338,667, where heating in a Lindbergh furnace is supplied to all the outside surface of the reaction mass at the same time.

More specifically, the formation of magnesium sulfate is carried out in three stages where each define a temperature gradient within the reaction mixture. It should be appreciated that when subjecting one surface of the reaction mixture that is within the range of 350° to 400° C., there are created three zones within the reaction mixture. The first zone is the zone that is being heated, while the second zone, or the intermediate zone, is at a temperature lower than the heating zone, but at a temperature higher than the third layer or zone of the mixture furthest away from the heated zone.

At the start of the heating, and until the heated zone reaches a temperature of about 250° C., there is a simple reaction taking place between the ammonium sulfate and the asbestos tailings which can be illustrated as follows:

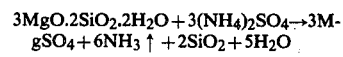

Once the temperature of the zone that is being heated increases from 250° C. up to the selected temperature within the range of 350° to 400° C., the reaction illustrated above continues to take place partly as such and partly by the decomposition of the ammonium sulfate to ammonium bisulfate which will start to sublimate at 250° C. and the sublimated ammonium bisulfate, upon reaching the next cooler zone, will condense and react 'in situ' with the evolving ammonia to reform ammonium sulfate which will then readily react with the asbestos tailings, as illustrated as follows.

At temperatures below 250° C.

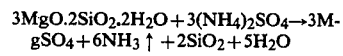

At temperatures above 250° C.

The sublimated $NH_4HSO_4$ and $NH_3$ gas upon arriving at zone cooler than 250° C.

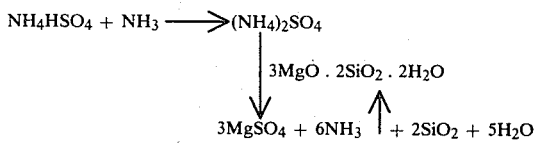

Finally, as the intermediate zone of the reaction mixture reaches a temperature of 250° C., the same procedure will occur again, that is, sulimation of the ammonium bisulfate, its condensation in the upper cooler zone, reaction with ammonia to form ammonium sulfate, which again reacts with the asbestos tailings.

It will be appreciated that the process of the present invention provides an unexpected great saving in energy by permitting the condensation of the ammonium bisulfate within the reaction mass and allowing the recovery of energy for the reaction of the ammonium bisulfate and ammonia to reform ammonium sulfate. The heating procedure of the present invention practically avoids any loss of reactants in oposition with the prior art heating procedure where the ammonium bisulfate formed can only move to a zone which is at a higher temperature and which is also at its sublimation temperature, and eventually when the said ammonium bisulfate reacts with the ammonia, this reaction takes place outside of the reaction mass, thus causing a substantially loss of energy and reactants since any ammonium sulfate formed outside of the reaction mass is no longer available for further reaction.

It should be appreciated that since the system of the present invention favors the condensation of the ammonium bisulfate within the reaction mixture, the energy expenditure to form said ammonium bisulfate is returned to the system by its condensation within the reaction system and its reaction with ammonia.

Accordingly, the improved process of the present invention comprises heating a heat transmissible support on which has been placed a dry homogeneous mixture of less than 6 inches of asbestos tailings and ammonium sulfate to a temperature of from 350° to 400° C. whereby the layer of the mixture in direct contact with the heated support gradually diffuses the heat to the remaining portion of the mixture thus causing the ammonium sulfate to react with the tailings and any ammonium bisulfate formed by the decomposition of ammonium sulfate to condense in contact with a layer of the mixture at a temperature lower than its sublimation temperature and thus favoring the recombination of the ammonium bisulfate and ammonia and terminating the heating procedure when the temperature of the layer of the homogeneous mixture furthest away from the heated layer reaches a temperature of about 350° C. to 385° C.

Consequently, if heat is applied under the charge and if the proper gradient of heat is maintained through the charge there is no loss of material by sublimation and the energy to be supplied is substantially decreased. The proper gradient to be maintained through the reaction mass is of 350° to 400° C. under the charge or on the heated side and a maximum of 250° to 385° C. on the cooler side, the ammonia being vented on the cool side of the charge.

OPERATING CONDITIONS

The reaction of ammonium sulfate with magnesium silicate can be further improved by the removal of unreacted ammonia from the reaction mixture since magnesium oxide is not much stronger than $NH_3$ as a base. One manner of removing the ammonia comprises circulating a gas, either nitrogen, air or steam above the charge. It has been noted that operating the reaction can be enhanced in terms of ammonia removal if the reaction was performed under reduced pressure, and the duration of the reaction will also be reduced in a substantial manner. For example, duration of reaction of two hours at atmospheric pressure can be reduced to from ten to fifteen minutes under a pressure of 18 mm of mercury for the same yield. Such an acceleration of the reaction rate is important since it corresponds to a reduction of the size of the equipment required for a given level of production.

In practice, the reaction mixture is provided in a layer varying from 0.25 to about 100 cm. The thickness of the reaction mixture will vary depending on whether or not hot air or steam is circulated through the reaction mixture. When no hot air or steam is circulated through the reaction mixture, a thickness of from 0.25 to 15 cm with 10 cm being preferred is used. On the other hand when hot air or steam is supplied to the support either through perforations therein or through ducts or conduits located at the support member, the thickness of the reaction mixture will be from 15 to 100 cm with from 80 to 100 cm being preferred, thus increasing the yield substantially per unit surface of the heated zone or furnace.

The support carrying the reaction mixture is positioned in a heating furnace adapted to supply heat to the under surface of the support which is made of a heat transmitting material such as stainless steel or mild steel. the bottom surface of the support may be flat or corrugated or it may be equipped with angular plates of the same material spaced apart and at an angle of from 45° to 90° with the base and extending to about 50% of the thickness of the reaction material. The use of angular plates decreases the time of reaction since more heat is supplied to the reaction mixture.

It should also be noted that when operating at atmospheric pressure a relatively large surface will have to be treated to arrive at a suitable production. Since the operation of any industrial process for treating asbestos tailings must consider all the cost factors, including, for example, size of the heating furnace, amount of energy required, it has been found that, if the unreacted ammonia formed during the process is evacuated, the reaction time for a given mass of reaction mixture will be reduced by at least tenfold with corresponding saving of energy and also a substantial saving in the reduction of the size of the furnace. For example, it is estimated that when a production of 0.08 lb of MgO per sq.ft/hr is obtained under normal atmospheric pressure, a yield of 0.8 lb of MgO per sq.ft/hr is obtained when operating under reduced pressure. If the ammonia formed is evacuated by circulating a current of gas such as air, nitrogen or steam, the yield of magnesium oxide in the form of magnesium sulfate reaches values of from 25 to 75 lbs MgO/sq. ft of furnace thus permitting a substantial decrease in the size of the furnace.

ENERGY SAVINGS

It has also been established that the heating of a reaction mixture of asbestos tailings and ammonium in a circular furnace, that is, a furnace where heat is supplied to the totality of the exterior surface of the treated mixture such as prescribed in U.S. Pat. No. 3,338,667 an energy expenditure of about 4 to 4.5 KWH/lb MgO will be required whereas only 1.0 to 1.5 KWH/lb MgO is required when proceeding in accordance with the present invention thus reducing the overall cost of producing magnesium basic carbonate by at least half the cost of the prior art procedures.

REACTION MIXTURE

The asbestos tailings which have practically no commercial value are used in as finely divided form as possible i.e. less than 48 mesh so as to insure an intimate and homogeneous mixture with the ammonium sulfate.

The ammonium sulfate used can be of the technical or fertilizer grade and the amount used should be in the stoichiometric amounts.

Mixing of the reaction mixture should be done prior to use of the reaction mixture and can be carried out in an industrial blender such as a ball mill blender.

RECOVERY OF MAGNESIUM SULFATE

When the reaction is completed, the resulting mass contains magnesium sulfate which can be recovered by leaching with water, adjusting the pH of the filtrate to between 8.0 to 8.5 thereby to precipitate the iron salts in the form of their hydroxides and after filtration reacting the filtrate with carbon dioxide-ammonia or ammonium carbonate thereby to precipitate basic magnesium carbonate in substantially pure form. The extraction procedure is well known in the art.

The invention will be more readily understood by referring to the following Examples which are given to illustrate the invention.

EXAMPLE 1

An intimate mixture of ammonium sulfate and asbestos tailings was prepared in a Waring blendor, the mixture being in the ratio of 1 part of tailings to 1.25 part of ammonium sulfate, such a ratio representing 1.25 time the required amount of $(NH_4)_2SO_4$. This mixture was placed in a stainless steel flat pan of $24 \times 17$ inches and the charge which was 0.5 inch thick introduced in a furnace so designed as to heat only the underpart of the pan. The initial charge of 2505 g was heated for a period of two hours, the temperature under the pan being kept constant at 395° C. and ammonia vented out from the top of the charge. After this heating the temperature above the charge was 295° C. and the reaction mixture was allowed to cool down and was analyzed for extracted magnesium. The analysis indicated that 183 g of magnesium oxide had been extracted, corresponding to a yield of 61%. The power used by the furnace was metered through a wattmeter and the consumption of power evaluated against a dry run. This consumption was of 443 watts or 1.1 KWH per pound of MgO extracted. It was noted that no appreciable sublimation of $(NH_4)_2SO_4$ took place during the experiment.

EXAMPLE 2

An experiment as in Example 1 was performed except that the excess of ammonium sulfate over the required amount was 1.50 instead of 1.25. After two hours, the reaction mixture was taken up in water and the magnesium extracted was determined. A yield of 69% was thus obtained with a power consumption of 0.91 KWH per pound of MgO extracted.

EXAMPLE 3

An experiment as in Example 1 was repeated in a similar fashion except that the thickness of the charge was 4 inches. After two hours, the temperature of the top surface was 190° C., the bottom of the pan having been kept at 395° C. throughout the two hour period. The experiment was then stopped and a cross section of the charge was examined. Three zones could be identified easily by visual inspection. The first zone (A), immediately in contact with the bottom of the pan, was almost white and made of soft, very friable material. The analysis of this layer, which was about half an inch thick, indicated that 71% of the magnesium present was magnesium sulfate. The second layer (B), immediately above layer (A), was a quarter to half an inch thick. It was made of fairly hard clinkers somewhat glossy and much darker than first layer. At that level, the percentage of extraction of available magnesium was 18%. Above layer (B) was a third layer (C) of gray material, almost three inch thick. This loose phase slightly tan contained only 6% of extracted magnesium.

If the time of reaction is increased to six hours, it has been noted that the (B) layer had moved upward, to about three inches from the bottom of the pan. The temperature of the top layer (C) was then 275° C. After a further heating of one hour, the reaction was considered completed and gave an overall yield of extracted magnesium of 64%.

EXAMPLE 4

In a steel reactor having a flat surface of 0.45 square foot, a charge of 890 g of a mixture of tailings and ammonium sulfate (molar ratio: 1.0 to 1.5) was heated at 350° C. for twelve minutes while being kept at a pressure of 18 mm of mercury. After this contact time, the mixture was analyzed and the yield of extracted magnesium found to be 60%. The production of magnesium sulfate corresponds to 0.80 lb of magnesium per hour, per square foot. The rate of production for an experiment as in Example 1 is 0.08 lb MgO per hour, per square foot.

EXAMPLE 5

A mixture of 5.00 g of asbestos tailings is intimately mixed with 10.6 g of ammonium sulfate (1.5 time the required amount) by stirring during two minutes in a Waring blendor. This mixture gives off ammonia fumes even at room temperature. This mixture, in the form of a fine powder, is placed in a cylindrical tube of 2 cm in diameter and the tube heated in a Lindberg furnace all around the charge for a period of two hours, at a temperature of 380° C. The reaction mixture is then taken up with 100 ml of water and magnesium in solution determined by atomic absorption. It has been found that 0.456 g of Mg was in solution, corresponding to an extraction of 46% of the magnesium available. At the colder part of the reaction tube there was a white sublimate which appeared in the course of the reaction. This material, weighting 1.85 g was identified as ammonium sulfate and represented 17% of the ammonium sulfate under experiment. The amount of energy required to perform the reaction was determined by measuring the electrical input in the furnace with the charge and without the charge, the temperature being maintained constantly by a temperature controller, within on degree C. The difference of 8.3 watts/h corresponds to 5.0 KWH per pound of extracted MgO. The experiment was repeated twice giving yields of 49% (4.8 KWH/lb MgO) and 45% (4.1 KWH/lb MgO).

EXAMPLE 6

The experiment was repeated as in Example 5 except that ammonium sulfate was introduced as spherical pellets, as sold for fertilizer purpose (diameter: 3 mm), the tailings being −48 mesh and mixed with the spheres of ammonium sulfate. Under such conditions, the yield of extracted magnesium was 32%.

TABLE I shows comparative results obtained by proceeding in accordance the method described in U.S. Pat. No. 3,338,667 and two alternatives of the process of the present invention.

TABLE I

|  | Ex. 3 | Ex. 4 | Ex. 5 |
|---|---|---|---|
| Pressure | normal | 18 mm/Hg | normal |
| Time required | 2 hrs. | 12 min. | 2 hrs. |
| MgO/hr in lb/sq.ft. |  |  |  |
| Flat surface | 0.08 | 0.8 |  |
| Corrugated surface | 0.25 | 1.25 |  |
| KWH/lb MgO | 1.1 | 1.1 | 4.8 |
| Yield | 64% | 60% | 47% |

EXAMPLE 7

In a Pyrex ® reactor, 2 inches in diameter and 36 inches high, a load of 2700 g of a mixture of tailings and ammonium sulfate in stoichiometric amounts was heated by a stream of steam having a pressure of 15 p.s.i. and a temperature of 400° C. The steam was admitted by a diffuser located at the bottom of the reactor. The temperature of the mixture was taken during the reaction. At one inch from the bottom of the reactor, the temperature was 350° C. after 5 minutes, 400° C. after 15 minutes, 400° C. after 20 minutes. One foot above the steam diffuser, the temperature of the reacting mass was 100° C. after 5 minutes, 270° C. after 15 minutes and 400° C. after 20 minutes. Two inches below the top of the charge, the temperature was 90° C. after 5 minutes, 210° C. after 15 minutes and 385° C. after 20 minutes. After 20 minutes the reaction was considered as completed. The analysis gave a yield of 81% in magnesium sulfate. The rate of production was then of 40 lb MgO per square foot per hour.

I claim:

1. In a dry process for forming magnesium sulfate by the reaction of asbestos tailings and ammonium sulfate, the improvement which comprises heating one surface only of a homogeneous dry mixture of asbestos tailings and ammonium sulfate from room temperature to a temperature within the range of 350° to 400° C., whereby until the temperature of the heated zone reaches about 250° C., the ammonium sulfate reacts with the asbestos tailings to form magnesium sulfate with evolution of gaseous ammonia, and when the temperature of the heated zone reaches at least 250° C., the ammonium sulfate decomposes to gaseous ammonia and sublimated ammonium bisulfate, allowing the latter two to progress to the intermediate zone which is at a temperature lower than 250° C., condensing the ammonium bisulfate and reacting it with the gaseous ammonia to form a new supply of ammonium sulfate which reacts with the asbestos tailings, and as the intermediate zone reaches a temperature above 250° C., the unreacted ammonium sulfate in this zone decomposes to ammonium bisulfate and ammonia, and as the latter two gases reach the outer zone of the reaction mixture condensing the ammonium bisulfate and reacting it with the ammonia to form a further supply of ammonium sulfate which reacts with the asbestos tailings, and continuing to heat the first heating zone until the temperature of the zone furthest away from the heating zone reaches a temperature of between 250° and 300° C., and recovering the magnesium sulfate from the reaction mixture.

2. The process of claim 1, wherein the heated surface is a flat surface.

3. The process of claim 1, wherein the heated surface is a corrugated surface.

4. The process of claim 1, wherein the heated surface is provided with angular heat diffusers embedded in the reaction mixture.

5. The process of claim 1, 2 or 3, wherein the reaction is carried out under reduced pressure.

6. The process of claim 4, wherein the reaction is carried out under reduced pressure.

7. The process of claim 1, 2 or 3, wherein the reaction mixture has a thickness of from 0.25 to 15 cm.

8. The process of claim 1, 2 or 3, wherein the reaction mixture has a thickness of about 10 cm.

9. The process of claim 1, wherein the ammonia formed is evacuated by circulating a stream of hot air or steam from the heating zone.

10. The process of claim 9, wherein the thickness of the reaction mixture is from 15 to 100 cm.

* * * * *